United States Patent
Sandoni et al.

(10) Patent No.: US 8,136,561 B2
(45) Date of Patent: Mar. 20, 2012

(54) METHOD FOR OPERATING A TIRE INFLATION SYSTEM OF A MOTOR VEHICLE AND TIRE INFLATION SYSTEM

(75) Inventors: Germano Sandoni, Graz (AT); Martin Ringdorfer, Trieben (AT)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 105 days.

(21) Appl. No.: 12/088,098

(22) PCT Filed: Sep. 28, 2006

(86) PCT No.: PCT/AT2006/000393
§ 371 (c)(1),
(2), (4) Date: Mar. 26, 2008

(87) PCT Pub. No.: WO2007/035975
PCT Pub. Date: Apr. 5, 2007

(65) Prior Publication Data
US 2008/0251177 A1    Oct. 16, 2008

(30) Foreign Application Priority Data

Sep. 28, 2005 (AT) .................................. GM656/2005

(51) Int. Cl.
*B60C 25/00* (2006.01)
*B60C 23/10* (2006.01)
(52) U.S. Cl. ........................................ 152/416; 152/415
(58) Field of Classification Search .......... 152/415–417; 137/224
See application file for complete search history.

(56) References Cited

U.S. PATENT DOCUMENTS

| 4,421,151 | A | 12/1983 | Stumpe |
| 4,498,515 | A | 2/1985 | Holtzhauser et al. |
| 5,327,346 | A * | 7/1994 | Goodell .......................... 701/71 |
| 5,674,332 | A | 10/1997 | Battocchio |
| 6,098,682 | A | 8/2000 | Kis |
| 6,892,776 | B2 * | 5/2005 | Skoff .......................... 152/342.1 |
| 6,943,673 | B2 * | 9/2005 | Skoff et al. ................... 340/442 |
| 2004/0055291 | A1 | 3/2004 | Meydieu et al. |

FOREIGN PATENT DOCUMENTS
DE    2826635    1/1980
DE    10223257    12/2003

* cited by examiner

*Primary Examiner* — Jason Bellinger
(74) *Attorney, Agent, or Firm* — Bachman & LaPointe, P.C.

(57) ABSTRACT

A tire inflation system of a motor vehicle comprises a compression device, a pressure accumulator from which inflation lines lead via an inflation valve and control lines lead via a control valve to a wheel valve, and the tire inflation system has a control device. A method for operating the tire inflation system carries out the following steps in a cyclically repeating sequence:
(1) acquisition of a set point tire pressure from operating variables,
(2) comparison with the actual tire pressure last measured,
(3) supply of air or extraction of air during a specific time period without accompanying pressure measurement, and
(4) measurement of the pressure in the inflation line and comparison with the set point value.

The system has a pressure sensor in the inflation line on the wheel side of the inflation valve, and each inflation valve is connected to a relief valve via a relief line, wherein the relief lines are connected to one another upstream of the relief valve.

9 Claims, 1 Drawing Sheet

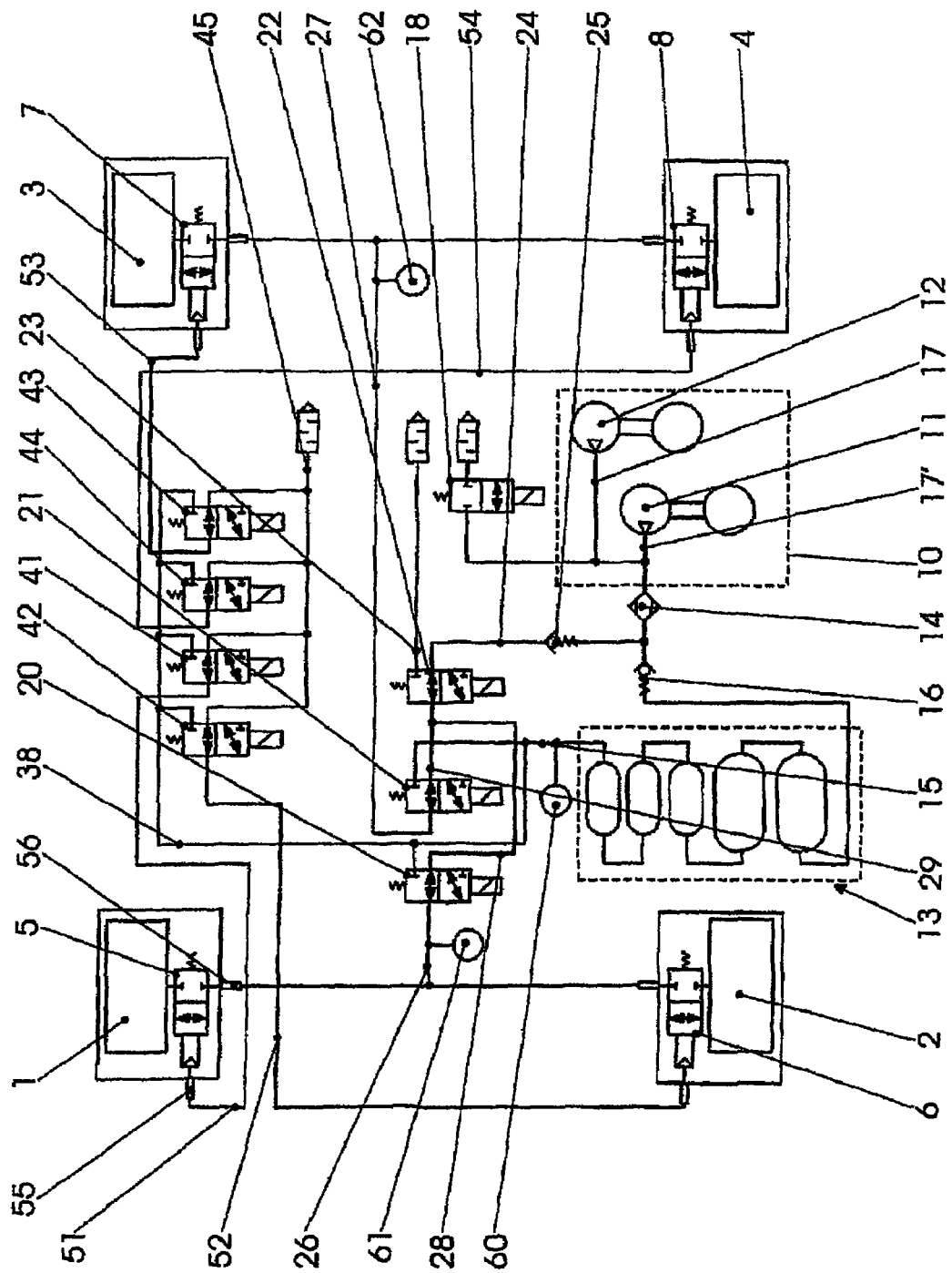

METHOD FOR OPERATING A TIRE INFLATION SYSTEM OF A MOTOR VEHICLE AND TIRE INFLATION SYSTEM

BACKGROUND OF THE INVENTION

The invention relates to a method for operating a tire inflation system of a motor vehicle, said tire inflation system being composed of a compressed air source which contains a compression device and a pressure accumulator and from which inflation lines lead via inflation valves and in each case one control line per wheel leads via a control valve to a wheel valve, and of a control device. Inflation valves can be respectively assigned to a wheel or to an axle. Each wheel is assigned a control valve.

Tire inflation systems are currently used only in (usually armored) offroad vehicles for which the considerable structural outlay that they entail is not significant. However, in future they are also to be used in passenger cars, but here to increase driving comfort. In future it is to be expected that tire pressure monitoring systems will be legally required and then the additional expenditure will be smaller.

Austrian utility model AT 5548 U1 discloses a tire inflation system of the generic type in which the tire pressure is measured by pressure sensors installed in the wheels. The transmission of data from the rotating wheel to the vehicle is problematic. It either takes place (as in AT 5548 U1) by means of sliding contacts and lines to a control unit which is fixed to the vehicle, or more recently has been carried out via radio. Exposed sliding contacts and data lines to the wheels are clearly disadvantageous. Transmission via radio requires in each wheel not only the sensors but also a transmitter (if only of very short range) and a power source, or a transponder. The measured values are generally not transmitted from all the wheels at the same time but in turn. The transmitters and receivers in the wheel and vehicle and the necessity to differentiate or separate the signals of the wheels from one another requires complex electronics. Owing to the transit time of the signals, the measurement is not even precise.

A further problem of all tire inflation systems is the necessity to provide, between the wheel and the vehicle, two compressed air connections, one for the inflation line and one for the control line which activates the wheel valve located in the wheel, said compressed air connections being embodied as rotary input means. Rotary input means are subject to increased wear for as long as they are under pressure. For this reason, the inflation line and the control line must be depressurized after each inflation process has ended. At the start of the next inflation process, they have to be filled up again. This entails a loss of compressed air and therefore an energy loss, which should be as small as possible.

The object of the invention is therefore to propose a tire inflation system and a method for operating it which solves the aforesaid problems, in particular that of measuring pressure in the simplest possible way.

SUMMARY OF THE INVENTION

The method according to the invention comprises (a) acquiring a set point tire pressure from operating variables; (b) comparing the set point tire pressure with an actual tire pressure last measured and determining whether air is to be fed to or extracted from a respective tire; (c) applying compressed air to a control line via a control valve and a wheel valve which is connected to the inflation line via a rotational input means and is arranged on the respective tire; (d) feeding or extracting air to the respective tire via the inflation line during a specific time period without accompanying pressure measurement; and (e) measuring the actual tire pressure in the inflation line and comparing same with a set point tire pressure. In this context, the individual tires are subjected to this method in turn. The measurement of the tire pressure is exported from the rotating wheels into the inflation lines which are fixed to the vehicle. As a result, the problem of transmitting data to the control unit is solved. Trials have revealed that a sufficiently precise measurement during the inflation process is not possible owing to dynamic effects (throttling losses in the lines, pressure fluctuations). For this reason the inflation process is broken up into alternate inflation and measurement processes and is therefore iterative.

In order to be able to carry out as few iterative cycles as possible, the specific time period during which air is fed to a tire by opening the respective control valve is determined from the current tire pressure, the pressure set point value and the container pressure. The current tire pressure is the pressure which was stored to the control unit from the last preceding pressure measurement. The determination can comprise a (more or less precise) calculation in advance or a rough estimate.

In one development of the method according to the invention, an analogous procedure is adopted when inflating and when lowering the tire pressure: in order to inflate a tire, the inflation line is first connected to the pressure source and the respective wheel valve is then opened by opening the respective control valve during the time period which is determined, and after the wheel valve has closed the inflation line is depressurized again.

In order to extract air from a tire, the inflation line is connected to a location with a relatively low pressure and the compressed air which is located therein is fed back to the compressed air source and stored there or discharged into the surroundings by activating the respective control valve and therefore by opening the wheel valve during the specific time period. For this purpose, the time period during which air is extracted from a tire by opening the respective control valve is determined from the current tire pressure, the pressure set point valve and, if appropriate, the counterpressure. The counterpressure may be the pressure in the accumulator of the pressure source, the atmospheric pressure or the atmospheric pressure increased by the pressure loss in the air drier.

As an alternative, in order to extract air from a tire, the inflation line can be emptied via a rapid-release venting valve. This shortens the time for which the rotational bushings are under pressure.

In order to measure the tire pressure, in one advantageous method procedure the respective emptied inflation line (or a further inflation line which is connected to it) is closed off at its end facing away from the respective tire, and the respective wheel valve is opened by means of the respective control valve. The air in the inflation line or in the inflation lines therefore assumes the pressure of the respective tire. The respective wheel valve remains opened until the pressure equalization between the respective wheel and the inflation line has occurred, and only then is the pressure in the inflation line measured. Said pressure is then the pressure in the respective tire. The respective inflation line is then emptied via the inflation valve.

The invention also relates to a tire inflation system of a motor vehicle which is particularly suitable for carrying out the method according to the invention and which is composed of a compressed air source which contains a compression device and a pressure accumulator and from which inflation lines lead via an inflation valve and control lines lead via a control valve to at least one wheel valve, and of a control device, wherein the compressed air source contains a compression device and a pressure accumulator.

According to the invention, a pressure sensor is arranged in the respective inflation line, downstream of the respective inflation valve, and each inflation valve is connected to a relief valve via a relief line, wherein the relief lines are connected to one another downstream of the relief valve. The pressure in the respective tire or tires can then be measured with a positionally fixed sensor, which ensures rapid and reliable transmission of signals.

Each inflation valve is preferably a three-position valve whose positions are an inflation position, a relief position and a measuring position. As a result, for the pressure measurement only the respective inflation line has to be connected to the tire as far as the inflation valve, which shortens the time up to the stabilization of the pressure in the corresponding inflation line and provides more precise measurements.

In a further development of the system according to the invention, a return line leads from the relief valve via a second non-return valve through an air drier and via a second relief valve into the atmosphere. In this way, the air drier can be regenerated in a simple and energy-saving fashion. In one advantageous development, the compressed air feed line leads from the compressor unit into the pressure accumulator via a first non-return valve and a return line, and a further pressure sensor is arranged downstream of the first non-return valve. The compressor unit is advantageously composed of two piston compressors which are connected in parallel in terms of the air which is fed by them.

BRIEF DESCRIPTION OF THE DRAWINGS

The invention will be described and explained in the text which follows with reference to a schematic illustration of the tire inflation system according to the invention as shown in FIG. 1.

DETAILED DESCRIPTION

FIG. 1 shows only the wheels or their tires 1, 2, 3, 4 with their wheel valves 5, 6, 7, 8 of a vehicle which is equipped with the system according to the invention. The tires 1, 2 are, for example, those of the front wheels. In order to make available the necessary compressed air, a compression device 10 is provided which is composed of a first compressor (11) and a second compressor (12). They are each driven independently of one another by an electric motor; their intake strokes which are connected to the surrounding are not illustrated and their discharge lines 17, 17' are combined and connected via an air drier 14 to a pressure accumulator 13 which serves as a compressed air source. The discharge lines 17, 17' can also be connected to the surroundings via a valve 18.

The compressed air which is output by the compression device 10 flows via a first non-return valve 16 to the pressure accumulator 13. The latter is connected via a supply line 15 to a first inflation valve 20 and a second inflation valve 21. Furthermore, a relief valve 22 is provided with a first venting line 23, which will be discussed later. A first inflation line 26 leads from the first inflation valve 20 to the two tires 1, 2. A second inflation line 27 leads from the second inflation valve 21 to the tires 3, 4. In the exemplary embodiment shown, the inflation line branches to both respective wheels of an axle, and a separate inflation line and a separate inflation valve could also be provided for each wheel. In the exemplary embodiment shown, the inflation valves 20, 21 are so-called 3/2 valves, that is to say in two different positions they can connect three connections to one another in various ways. In one position, the inflation valve 20 or 21 connects the supply line 15 to the inflation line 26 or 27, and in the second position it connects the latter to a relief line 28 or 29. The two relief lines 28, 29 are connected to one another and end at the relief valve 22, which is also again a 3/2 valve. Alternatively, a separate relief valve could be provided for each inflation line. From said valve, on the one hand the first venting line 23 leads into the open air and on the other hand a return line 24 leads via a second non-return valve 25 and the first non-return valve 16 back into the pressure accumulator 13.

A further supply line 38 branches from the supply line 15 and leads to the wheel-specific control valves 41, 42, 43 and 44. These are also 3/2-valves which either connect the further supply line 38 to, in each case, one control line 51, 52, 53, and 54 or to a second venting line 45 which leads into the open air. Each of the control lines 51, 52, 53, 54 leads via first rotational input means 55 (only denoted on the tire 1) to the respective wheel valve 5, 6, 7, 8. The inflation lines 26, 27 themselves are also connected by line to the respective wheel valve 5, 6, 7, 8 via a second rotational input means 56. The wheel valves are therefore activated pneumatically by the control valves and can therefore rapidly switch the necessary air stream despite requiring only a small amount of space.

The inflation valves 20, 21, the relief valve 22 which is embodied as a rapid-release relief valve, the relief valve 18 and the control valves 41, 42, 43, 44 are solenoid valves which are actuated by a control device (not illustrated). They are spring-loaded in the sense that if the system fails they assume the safe position. Neither the control device nor the control lines leading to the valves are shown for the sake of clarity. The control device determines a set point pressure for each of the tires from operating variables (vehicle weight, wheel load, speed, commands issued by the driver, data stored from preceding calculation processes), and compares said set point pressure with the pressure which is signaled by the pressure sensors 61, 62. Furthermore the drive motors of the compressors 11, 12 are also actuated by the control device, for which purpose the pressure measured by the first pressure sensor 60 in the pressure accumulator 13 is also used as an input signal. The compressors 11, 12 may start up individually, and to facilitate the drive they can even start up when the second relief valve 18 is opened. The control unit also contains a program which successively interrogates the tire pressure at certain intervals or when certain events occur, compares said tire pressure with the set point pressure which may have possibly changed in the meantime, and commands the described sequences if there is a deviation.

In the text which follows, the method of working of the device according to the invention is described. If the motor vehicle moves with the under "correct" air pressure at all four wheels, the tire inflation system is in the state of rest shown in the single FIGURE by means of the valve positions. The compressors 11, 12 are stationary, the pressure accumulator 13 is fully charged and the supply line 15 is at maximum pressure. The two inflation valves 20, 21 are closed toward the supply line 15, as are the control valves 41 to 44. This reduces the stress on the rotational input means. The inflation lines 26, 27 are connected via the inflation valves 20, 21 to their relief lines 28, 29. Only the relief valve 22 could also be opened (in contrast to how it is illustrated in the FIGURE).

Therefore, all of the two inflation lines 26, 27 with their relief lines 28, 29 and the control lines 51 to 54 are pressureless.

The tire pressure should be increased if either the pressure measurement reveals values below the set point values or if the set point values have changed owing to changed operating conditions or due to selective intervention by the driver. If the measured values are below the set point values, for example in the tire 1 of the front axle, the first inflation valve 20 is switched over so that it produces the connection between the supply line 15 and the first inflation line 26 and at the same time the relief valve 22 is moved into the position as per the FIGURE. As a result, the inflation line 26 assumes the pressure of the pressure accumulator 13. However, owing to the closed wheel valves 5, 6, air still cannot flow into the tires 1, 2. If only the pressure in the tire 1 is increased, only the first control valve 41 is actuated, as a result of which the wheel valve 5 is opened and air starts to flow into the tire 1.

Before or at the same time as the opening process, the control unit has determined, from the pressure difference between the set point pressure and actual pressure of the respective tire and from the pressure in the pressure accumulator 13 (estimated or calculated), for how long the control valve 41 and therefore the wheel valve 5 will have to be opened in order to approximate to the set point pressure as closely as possible. After this determined time period has expired, the control valve 41 is closed again. During inflation of the tire 1, the pressure in the inflation line 26 fluctuates to a very great degree, and owing to the throttling losses in the wheel valve 5 said pressure is also significantly higher than the pressure in the tire 1. For this reason, the pressure cannot be measured during the inflation process. The measurement does not occur until after the wheel valve has closed, and occurs specifically as follows:

In order to measure the pressure, the inflation line 26 is first depressurized, as in the position of rest defined at the beginning. For this purpose, the inflation line 26 is connected to the surroundings via the first relief line 28 and the relief valve 22. As a result, the pressure in the inflation line drops to atmospheric pressure. Subsequently, the relief valve 22 is closed again but the inflation valves 20, 21 remain in the position shown, in which it clears the connection between the inflation line 26 and the relief lines 28, 29. Likewise, the respective inflation valve could also be closed if a pressure sensor were present at the tire side, and in certain circumstances even without previously depressurizing the respective inflation line. If the wheel valve 5 is now opened again by activating only the first control valve 41, the pressure prevailing in the tire 1 is transferred to the first inflation line 26, and also to the second inflation line 27 via the first inflation valve 20 and the relief lines 28, 29.

In a variant (not illustrated) the inflation valves 20, 21 are embodied as 3-position valves (3/3 valves), and then it is not necessary to close the relief valve 22 and only the first inflation line assumes the pressure prevailing in the respective tire. After a short time, the pressure equalization has taken place and the measured value at the first pressure sensor 61 can be fed to the control unit and compared there with the set point pressure. If the set point pressure and actual pressure differ, a further cycle is carried out, as described above. Instead of the 3/3 valve, a 3/2 valve and a non-return valve could also be used.

If the pressure in the first tire is higher than the set point value, air must be discharged. To do this, the control unit calculates the anticipated opening time of the control valve 41 again, this time on the basis of the pressure in the tire 1 and the set point pressure. However, first the first inflation valve 20 is moved into the position shown in the FIGURE and the connection via the first relief line 28, the now opened relief valve 22 and the first venting line 23 to the surroundings is therefore made. The control valve 41 is then opened for the estimated time during which air can flow out of the tire 1. Here too, a pressure measurement subsequently takes place, as described above. If the pressure in the pressure accumulator 13 has dropped severely, the air which is discharged can also be fed back into the pressure accumulator 13 via the two non-return valves 25, 26 when the relief valve 22 is closed.

The invention claimed is:

1. Method for operating a tire inflation system of a motor vehicle, wherein the tire inflation system comprises a compressed air source which contains a compression device, a pressure accumulator from which inflation lines lead via an inflation valve and control lines lead via control valves from the control lines to respective tires via wheel valves, comprising the steps of:
   a) acquiring a set point tire pressure from operating variables;
   b) comparing the set point tire pressure with an actual tire pressure last measured and determining whether air is to be fed to or extracted from a respective tire;
   c) applying compressed air to the control lines via the control valves and wheel valves which are connected to the inflation lines via a rotational input means and is arranged on respective tires and is controlled by compressed air applied via the control lines and independently from the inflation lines;
   d) feeding or extracting air to the respective tires via the inflation lines during a specific time period without accompanying pressure measurement;
   e) measuring the actual tire pressure in the inflation lines and comparing same with a set point tire pressure;
   f) if the actual tire pressure does not correspond to the set point tire pressure, feeding to or extracting air from the at least one tire via the inflation lines during a specific time period without accompanying pressure measurement; and
   g) if the measured actual tire pressure corresponds to the set point tire pressure, the cycle in accordance with steps a) b) c) d) e) f) is not repeated again until after a specific time period or until a specific operating state occurs.

2. Method according to claim 1, including determining from the current tire pressure, the pressure set point value and the container pressure, the specific time period during which air is fed to the tire by opening a respective control valve.

3. Method according to claim 2, wherein, in order to inflate a tire, an inflation line is first connected to the pressure source and a respective wheel valve is then opened by opening the respective control valve during the time period which is determined.

4. Method according to claim 3, wherein the time period during which air is extracted from the tire by opening the respective control valve is determined from the current tire pressure and the pressure set point value.

5. Method according to claim 4, wherein, in order to extract air from a tire, the inflation line is connected to a location with a relatively low air pressure and the compressed air which is located therein is either fed back to the compressed air source and stored there or discharged into the surroundings by activating the respective control valve and therefore by opening the respective wheel valve during the specific time period.

6. Method according to claim 4, wherein, in order to extract air from a tire, the inflation line can be emptied by a rapid-release venting valve.

7. Method according to claim 1, wherein, in order to measure the tire pressure, the respective emptied inflation line is fluidically connected to respective tire by actuating the respective wheel valve while said inflation line is closed off at its other end.

8. Method according to claim 7, wherein the respective wheel valve remains opened until the pressure equalization between the respective wheel and the inflation line has occurred, and only then is the pressure in the inflation line measured.

9. Method according to claim 8, wherein, after the pressure has been measured, the respective inflation line is emptied.

\* \* \* \* \*